(12) United States Patent
Hamend

(10) Patent No.: US 7,044,488 B1
(45) Date of Patent: May 16, 2006

(54) SCOOTER ASSEMBLY

(76) Inventor: Arone Hamend, 5679 Creekside Pl., Sechelt, BC (CA) VON 3A8

( * ) Notice: Subject to any disclaimer, the term of this patent is extended or adjusted under 35 U.S.C. 154(b) by 0 days.

(21) Appl. No.: 10/954,318

(22) Filed: Sep. 30, 2004

(51) Int. Cl.
*B62M 1/00* (2006.01)

(52) U.S. Cl. .......................... 280/221; 280/62; 280/63

(58) Field of Classification Search ............... 280/221, 280/62, 63
See application file for complete search history.

(56) References Cited

U.S. PATENT DOCUMENTS

| | | | | |
|---|---|---|---|---|
| 1,237,969 A | * | 8/1917 | Stocks | 280/251 |
| 2,544,996 A | * | 3/1951 | Kander | 280/251 |
| 2,580,112 A | * | 12/1951 | Marchetti | 280/496 |
| 3,175,844 A | * | 3/1965 | Whitehouse | 280/221 |
| 3,362,723 A | | 1/1968 | Bretholz | |
| 3,992,029 A | * | 11/1976 | Washizawa et al. | 280/221 |
| 4,124,222 A | * | 11/1978 | Moe et al. | 280/221 |
| 4,186,934 A | | 2/1980 | Collings | |
| D289,065 S | | 3/1987 | Schultz | |
| 5,192,089 A | | 3/1993 | Taylor | |
| 5,224,724 A | | 7/1993 | Greenwood | |
| 5,294,140 A | | 3/1994 | Rinkewich | |
| 6,659,486 B1 | * | 12/2003 | Eschenbach | 280/221 |
| 2003/0098566 A1 | * | 5/2003 | Christensen et al. | 281/221 |

* cited by examiner

*Primary Examiner*—Lesley D. Morris
*Assistant Examiner*—Marlon Arce-Diaz

(57) ABSTRACT

A scooter assembly for providing a scooter that would allow a user to move forward by simply shifting their weight. The scooter assembly includes a frame. A pair of wheels is coupled to the frame for supporting the frame on the pair of wheels. The pair of wheels is a front wheel and a rear wheel. A steering assembly is operationally coupled to the front wheel to permit turning of the front wheel. A drive mechanism is operationally coupled to the rear wheel for rotating the rear wheel to propel the scooter in a forward direction.

11 Claims, 5 Drawing Sheets

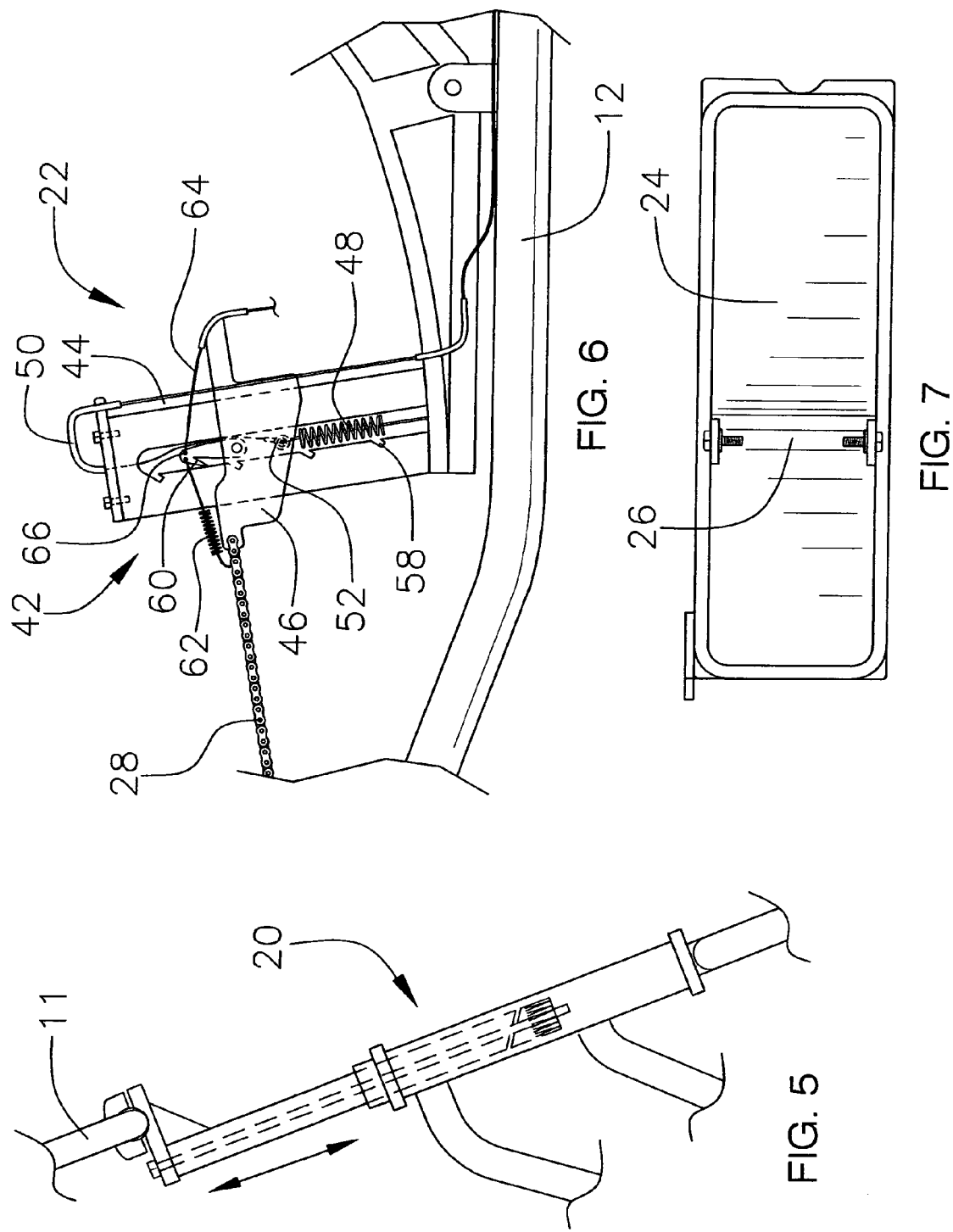

US 7,044,488 B1

SCOOTER ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

The present invention relates to scooter assemblies and, more particularly, pertains to a new scooter assembly for providing a scooter that would allow a user to move forward by simply shifting their weight.

2. Prior Art

The use of scooter assemblies is known in the prior art. U.S. Pat. No. 4,186,934 describes a scooter vehicle having a ratchet drive. Another type of scooter assemblies is U.S. Pat. No. 5,192,089 describes a pedal operated scooter. U.S. Pat. No. 5,224,724 describes a scooter with a simple harmonic drive. U.S. Pat. No. 5,294,140 describes a self propelled vehicle having a pair of foot treadles. U.S. Pat. No. 3,362,723 describes a scooter type vehicle with a clutch driven member driven by a foot treadle.

BRIEF SUMMARY OF THE INVENTION

An object of the present invention is to provide a new scooter assembly that would be safer and easier than putting one foot down on the pavement. As a result, the user could ride longer without tiring. Still yet another object of the present invention is to provide a new scooter assembly that could be offered in various sizes to fit all users.

To this end, the present invention generally comprises includes a frame. A pair of wheels is coupled to the frame for supporting the frame on the pair of wheels. The pair of wheels is a front wheel and a rear wheel. A steering assembly is coupled to the frame. The steering assembly is operationally coupled to the front wheel to permit turning of the front wheel. A drive mechanism is operationally coupled to the rear wheel for rotating the rear wheel to propel the scooter in a forward direction.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE SEVERAL VIEWS OF THE DRAWING

The invention will be better understood and objects other than those set forth above will become apparent when consideration is given to the following detailed description thereof. Such description makes reference to the annexed drawings wherein:

FIG. 5 is an enlarged side elevational view of the handle bar assembly shown in FIG. 4;

FIG. 6 is an enlarged side elevational view showing the spring connected to the drive chain;

FIG. 7 is a top plan view of a scooter pedal, in accordance with the present invention.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
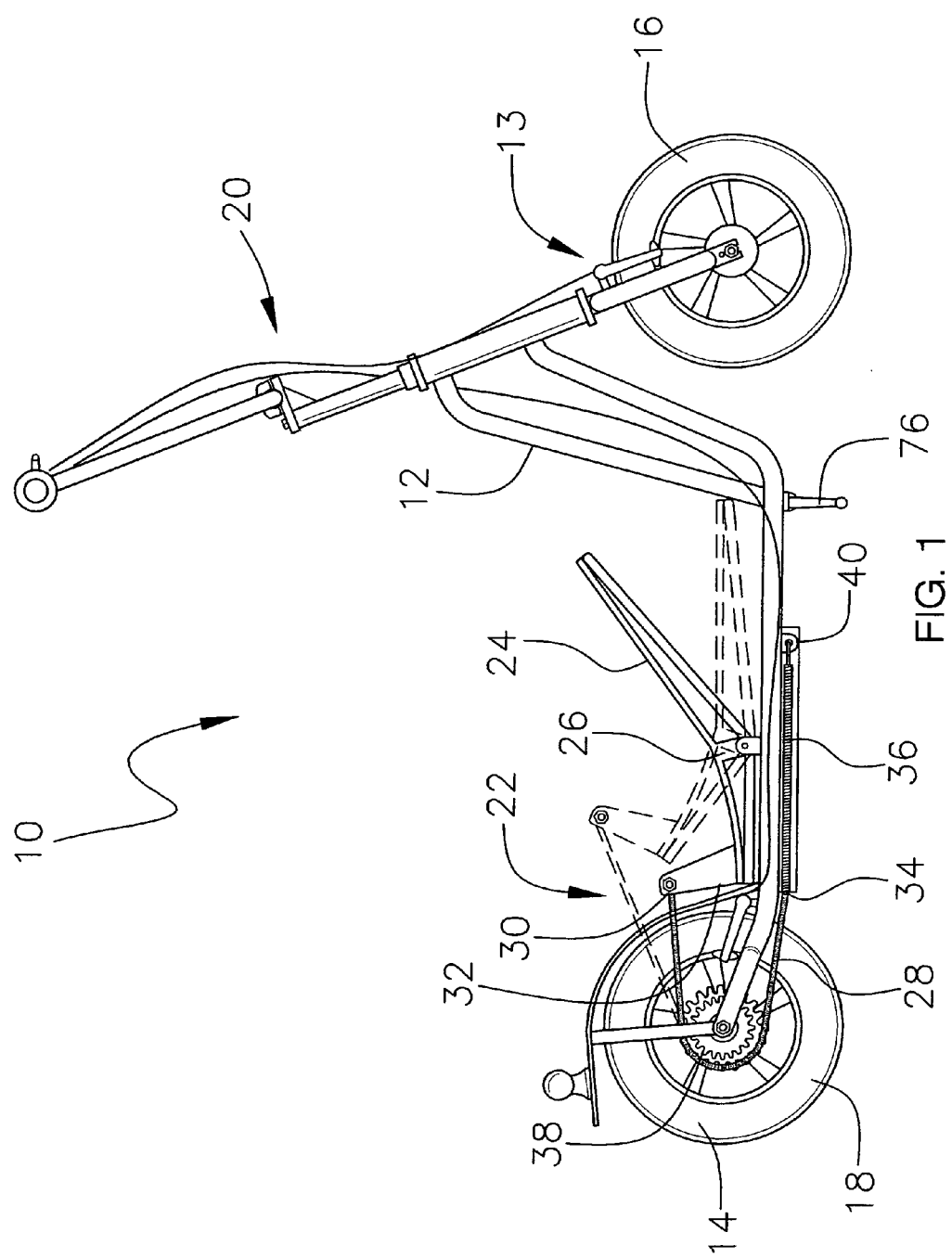
FIG. 1 is a side elevational view of a new scooter assembly according to the present invention.
Figure 2:
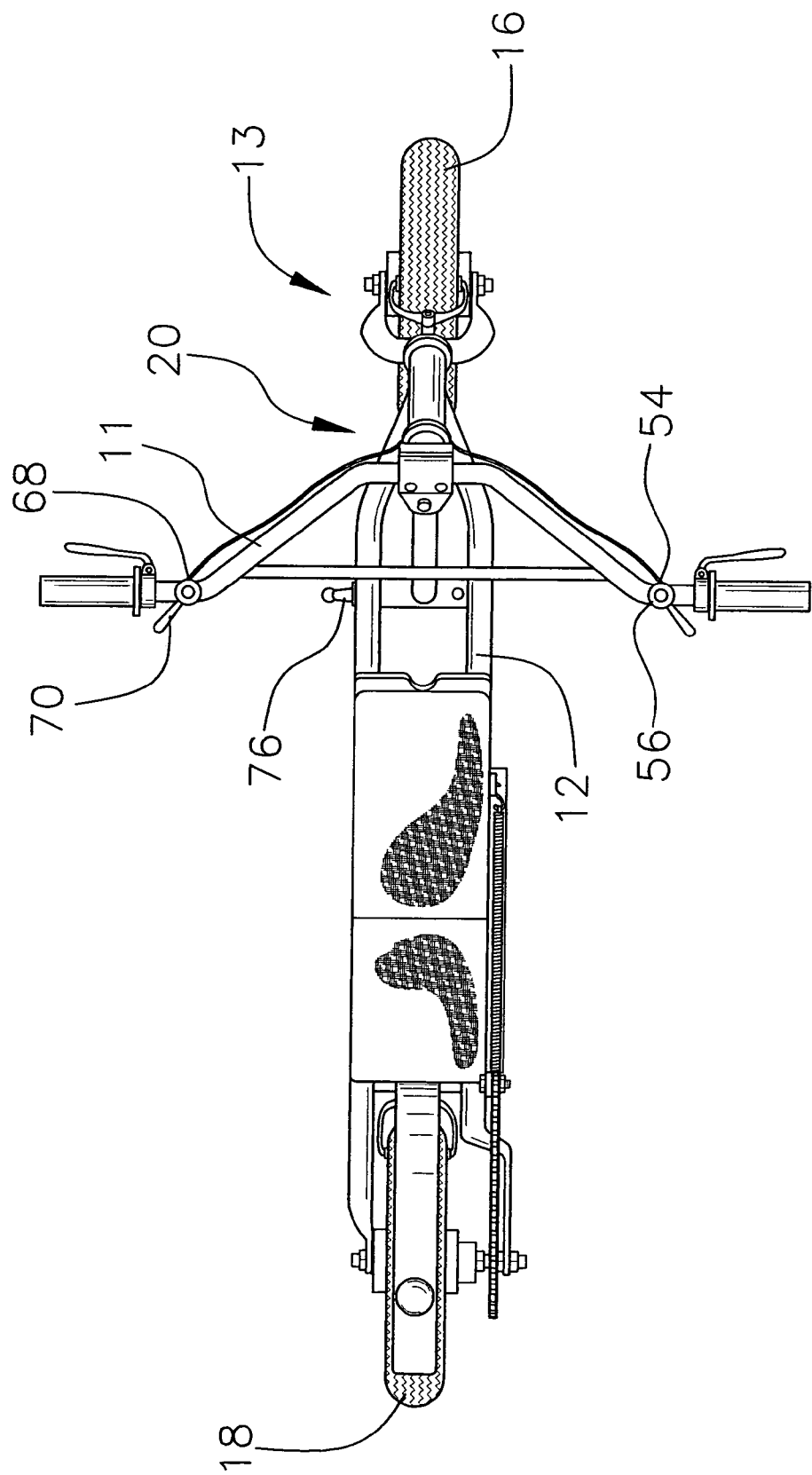
FIG. 2 is a top plan view of the scooter shown in FIG. 1.
Figure 3:
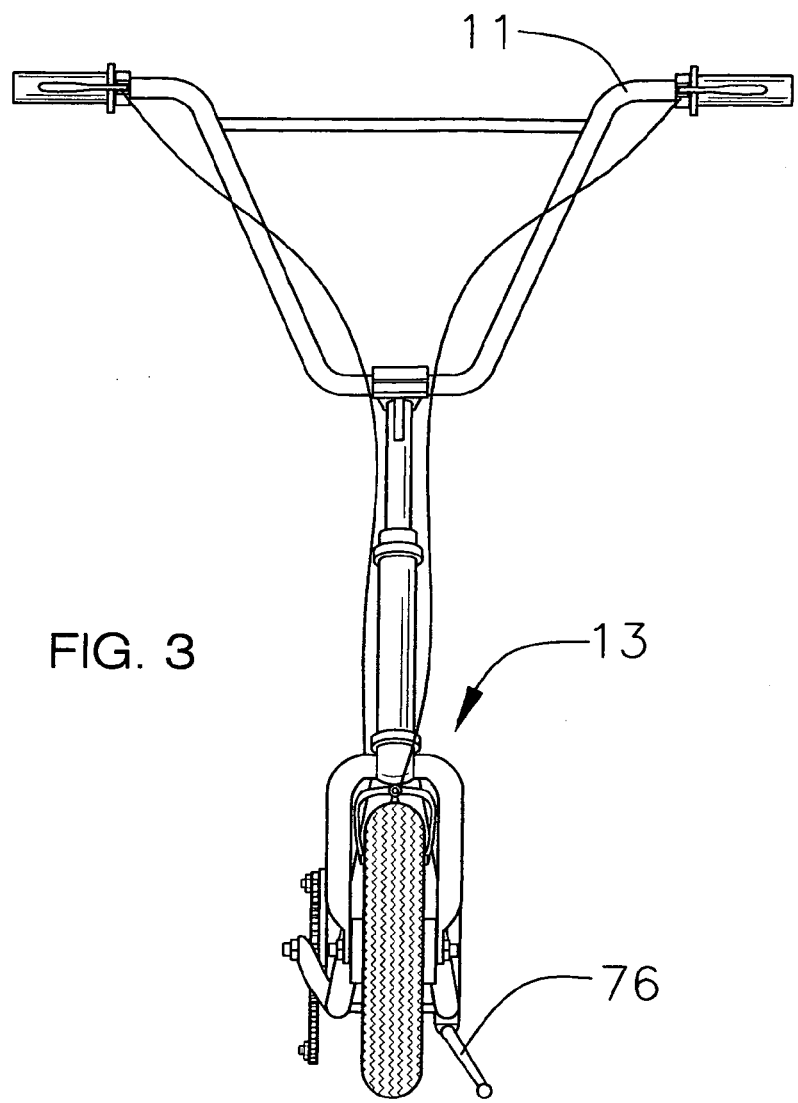
FIG. 3 is a front elevational view of the scooter shown in FIG. 1.
Figure 4:
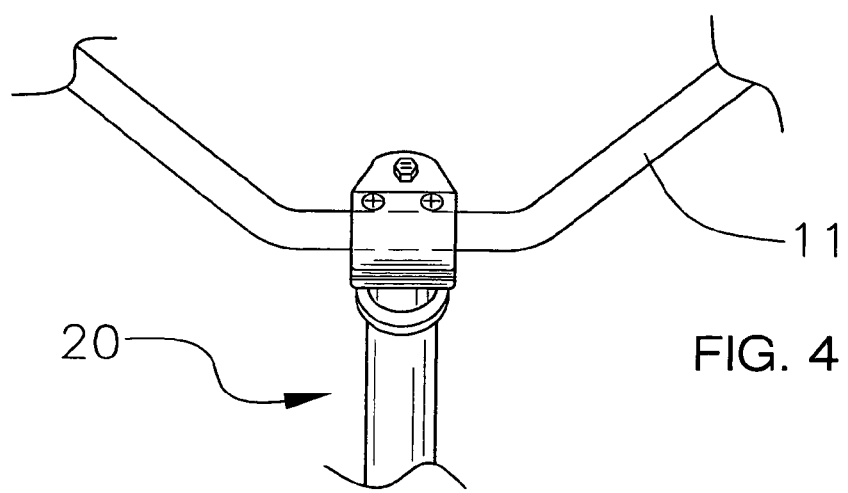
FIG. 4 is a perspective view of the scooter handle bar assembly.
Figure 8:
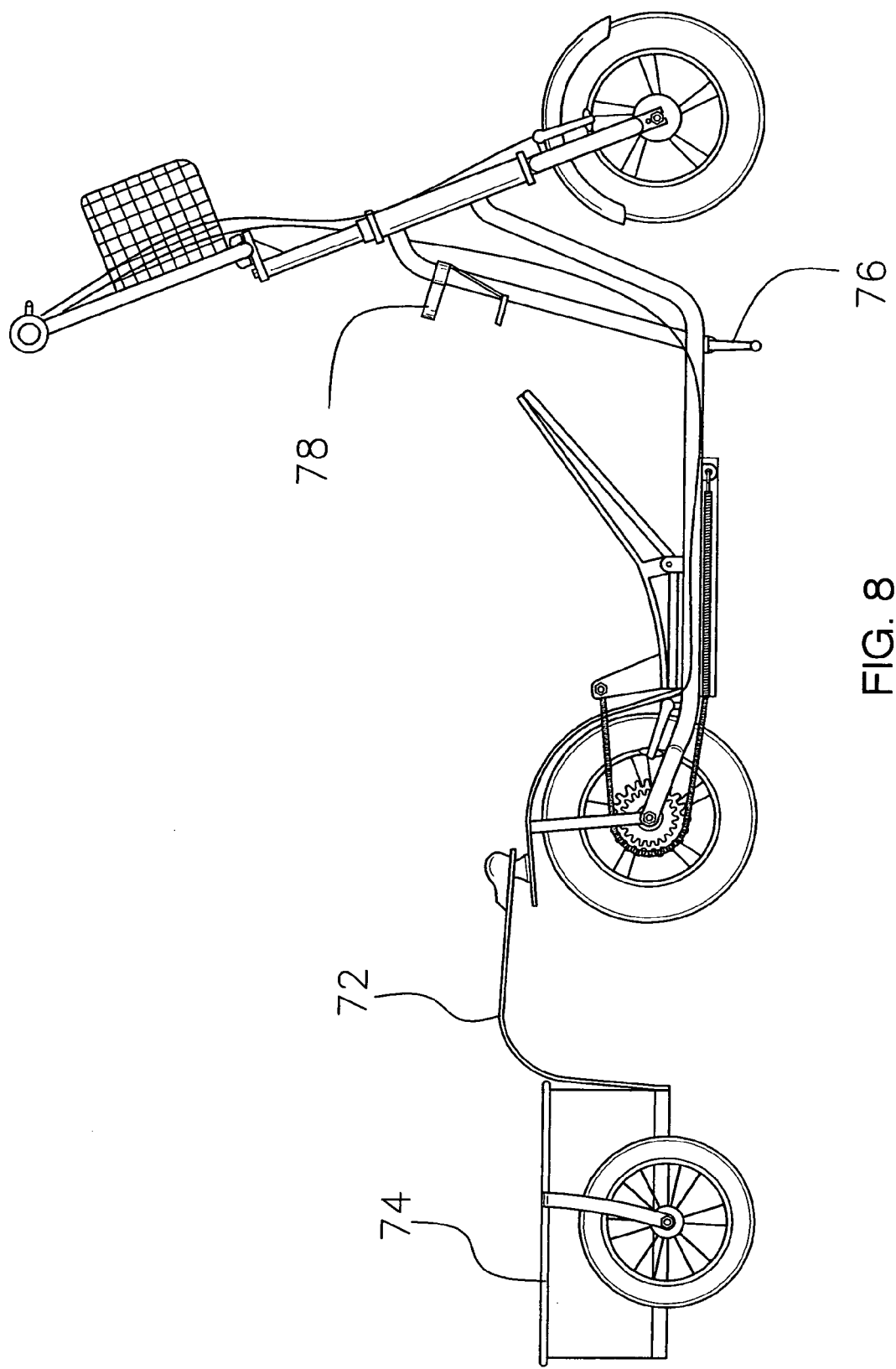
FIG. 8 is a side elevational view showing an alternate embodiment of the present invention including a front basket and rear trailer attached to the scooter, respectively.

The apparatus of this invention is best illustrated in FIGS. 1 through 8. Referring initially to FIGS. 1–4, the scooter assembly 10 generally includes a frame 12. A pair of wheels 14 is coupled to the frame 12 for supporting the frame 12 on the pair of wheels 14. The pair of wheels 14 is a front wheel 16 and a rear wheel 18. A steering assembly 20 is coupled to the frame 12. The steering assembly 20 is operationally coupled to the front wheel 16 to permit turning of the front wheel 16. A drive mechanism 22 is operationally coupled to the rear wheel 18 for rotating the rear wheel 18 to propel the scooter in a forward direction.

Now referring to FIGS. 6–7, the drive mechanism 22 includes a generally V-shaped drive pedal 24. The drive pedal 24 is pivotally coupled to the frame 12 at a medial point 26 to permit pivoting of the drive pedal 24. A drive chain 28 has a first end 30 coupled to a rear portion 32 of the drive pedal 24 and a second end 34 coupled to the frame 12. The drive chain 28 includes a spring portion 36 for permitting expansion of a length of the drive chain 28 when the drive pedal 24 is pivoted forwardly. A sprocket 38 is coupled to the rear wheel 18, the drive chain 28 engages the sprocket 38 whereby the drive chain 28 rotates the wheel when the drive pedal 24 is pivoted forwardly. A tube shaped housing 40 is coupled to the frame 12. A portion of the drive chain 28 extends through the housing 40. The drive pedal 24 includes a gearing mechanism 42 for adjusting a coupling position of the first end 30 of the drive chain 28 on the drive pedal 24 whereby an amount of rotation of the rear wheel 18 when the drive pedal 24 is pivoted is adjustable.

The gearing mechanism 42 includes a slotted gear housing 44 that extends upwardly from the rear portion of the drive pedal 24. A collar 46 is coupled to the slotted gear housing 44. A collar biasing member 48 is coupled to the slotted gear housing 44 and the collar 46 for urging the collar 46 in a first direction. A gear adjustment cable 50 has a first end 52 coupled to the collar 46 and a second end 54 coupled to a gear shifter 56 for selectively urging the collar 46 in a second direction opposite the first direction. The slotted ear housing 44 includes a plurality of interior collar locking notches 58.

A hook member 60 is pivotally coupled to the collar 46. A hook biasing member 62 is coupled to the hook member 60 for urging the hook member 60 into engagement with a selectable one of the collar locking notches 58. A collar release cable 64 has a first end 66 coupled to the hook member 60 and a second end 68 coupled to a lock releaser 70 coupled to the frame 12 whereby the hook member 60 is selectively disengageable from each of the collar locking notches 58 to permit movement of the collar 46 in the first direction. A hitch member 72 extends rearwardly from the frame 12. A trailer 74 is coupled to the hitch member 72, as perhaps best shown in FIG. 8. A kickstand 76 is coupled to the frame 12 for supporting the scooter in an upright position when the kickstand 76 is in an extended position.

A bottle holder 78 is coupled to the frame 12 whereby the scooter is adapted for holding a bottle during use. The steering assembly 20 includes a handle member 11. The gear shifter 56 is coupled to the handle member 11 for facilitating use of the gear shift 56 by a user during use of the scooter.

The lock releaser 70 is coupled to the handle member 11 for facilitating use of the lock releaser 70 by a user during use of the scooter. A brake assembly 13 is coupled to the frame 12 and operationally coupled to one of the wheels 14 for restricting rotation of the one of the wheels 14.

In use, a user would place one foot on the front and one foot on the back of the pivoting footboard. As the user shift their weight, the drive pedal would pivot, and the drive mechanism would turn the rear wheel to propel the scooter forward.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A scooter assembly comprising:
    a frame;
    a pair of wheels coupled to said frame for supporting said frame on said pair of wheels, said pair of wheels being a front wheel and a rear wheel;
    a steering assembly coupled to said frame, said steering assembly being operationally coupled to said front wheel to permit turning of said front wheel; and
    a drive mechanism operationally coupled said rear wheel for rotating said rear wheel to propel said scooter in a forward direction, said drive mechanism comprising
    a generally V-shaped drive pedal, said drive pedal being pivotally coupled to said frame at a medial point to permit pivoting of said drive pedal,
    a drive chain having a first end coupled to a rear portion of said drive pedal and a second end coupled to said frame, said drive chain including a spring portion for permitting expansion of a length of said drive chain when said drive pedal is pivoted forwardly, and
    a sprocket coupled to said rear wheel, said drive chain engaging said sprocket whereby said drive chain rotates said wheel when said drive pedal is pivoted forwardly;
    wherein said drive pedal comprises a gearing mechanism for adjusting a coupling position of said first end of said drive chain on said drive pedal whereby an amount of rotation of said rear wheel when said drive pedal is pivoted is adjustable.

2. The scooter assembly of claim 1, further comprising:
    a tube shaped housing coupled to said frame, a portion of said drive chain extending through said housing.

3. The scooter assembly of claim 1, wherein said gearing mechanism comprises:
    a slotted gear housing extending upwardly from said rear portion of said drive pedal;
    a collar coupled to said slotted gear housing;
    a collar biasing member coupled to said slotted gear housing and said collar for urging said collar in a first direction;
    a gear adjustment cable having a first end coupled to said collar and a second end coupled to a gear shifter for selectively urging said collar in a second direction opposite said first direction.

4. The scooter assembly of claim 3, further comprising:
    said slotted gear housing including a plurality of interior collar locking notches;
    a hook member pivotally coupled to said collar;
    a hook biasing member coupled to said hook member for urging said hook member into engagement with a selectable one of said collar locking notches; and
    a collar release cable having a first end coupled to said hook member and a second end coupled to a lock releaser coupled to said frame whereby said hook member is selectively disengageable from each of said collar locking notches to permit movement of said collar in said first direction.

5. The scooter assembly of claim 1, further comprising:
    a hitch member extending rearwardly from said frame; and
    a trailer coupled to said hitch member.

6. The scooter assembly of claim 1, further comprising:
    a kickstand coupled to said frame for supporting said scooter in an upright position when said kickstand is in an extended position.

7. The scooter assembly of claim 1, further comprising:
    a bottle holder coupled to said frame whereby said scooter is adapted for holding a bottle during use.

8. The scooter assembly of claim 4, wherein said steering assembly further comprises a handle member;
    said gear shifter being coupled to said handle member for facilitating use of said gear shifter by a user during use of said scooter.

9. The scooter assembly of claim 5, wherein said steering assembly further comprises a handle member;
    said lock releaser being coupled to said handle member for facilitating use of said lock releaser by a user during use of said scooter.

10. The scooter assembly of claim 1, further comprising:
a brake assembly coupled to said frame and operationally coupled to one of said wheels for restricting rotation of said one of said wheels.

11. A scooter assembly comprising:
a frame;
a pair of wheels coupled to said frame for supporting said frame on said pair of wheels, said pair of wheels being a front wheel and a rear wheel;
a steering assembly coupled to said frame, said steering assembly being operationally coupled to said front wheel to permit turning of said front wheel;
a drive mechanism operationally coupled to said rear wheel for rotating said rear wheel to propel said scooter in a forward direction, said drive mechanism comprising
  a generally V-shaped drive pedal, said drive pedal being pivotally coupled to said frame at a medial point to permit pivoting of said drive pedal,
  a drive chain having a first end coupled to a rear portion of said drive pedal and a second end portion coupled to said frame, said drive chain including a spring portion for permitting expansion of a length of said drive chain when said drive pedal is pivoted forwardly, and
  a sprocket coupled to said rear wheel, said drive chain engaging said sprocket whereby said drive chain rotates said wheel when said drive pedal is pivoted forwardly;
a tube shaped housing coupled to said frame, a portion of said drive chain extending through said housing;
said drive pedal including a gearing mechanism for adjusting a coupling position of said first end of said drive chain on said drive pedal whereby an amount of rotation of said rear wheel when said drive pedal is pivoted is adjustable;
wherein said gearing mechanism includes:
  a slotted gear housing extending upwardly from said rear portion of said drive pedal,
  a collar coupled to said slotted gear housing,
  a collar biasing member coupled to said slotted gear housing and said collar for urging said collar in a first direction, and
  a gear adjustment cable having a first end coupled to said collar and a second end coupled to a gear shifter for selectively urging said collar in a second direction opposite said first direction;
said slotted gear housing including a plurality of interior collar locking notches;
a hook member pivotally coupled to said collar;
a hook biasing member coupled to said hook member for urging said hook member into engagement with a selectable one of said collar locking notches;
a collar release cable having a first end coupled to said hook member and a second end coupled to a lock releaser coupled to said frame whereby said hook member is selectively disengageable from each of said collar locking notches to permit movement of said collar in said first direction;
a hitch member extending rearwardly from said frame;
a trailer coupled to said hitch member;
a kickstand coupled to said frame for supporting said scooter in an upright position when said kickstand is in an extended position;
a bottle holder coupled to said frame whereby said scooter is adapted for holding a bottle during use;
said steering assembly including a handle member;
said gear shifter being coupled to said handle member for facilitating use of said gear shifter by a user during use of said scooter;
said lock releaser being coupled to said handle member for facilitating use of said lock releaser by a user during use of said scooter, and
a brake assembly coupled to said frame and operationally coupled to one of said wheels for restricting rotation of said one of said wheels.

* * * * *